(12) United States Patent
Hopman et al.

(10) Patent No.: US 9,242,806 B2
(45) Date of Patent: Jan. 26, 2016

(54) APPARATUS FOR TRANSPORT AND CONTROLLED DISCHARGE OF PRODUCTS

(75) Inventors: Jozef Walter Maria Hopman, Huizen (NL); Patrick Theodorus Johannes Van Haaster, De Zilk (NL); Martinus Fredericus Johannes Duivenvoorden, De Zilk (NL)

(73) Assignee: Trinovate B.V., Weesp (NL)

( * ) Notice: Subject to any disclaimer, the term of this patent is extended or adjusted under 35 U.S.C. 154(b) by 0 days.

(21) Appl. No.: 14/114,011

(22) PCT Filed: Apr. 27, 2012

(86) PCT No.: PCT/EP2012/057769
§ 371 (c)(1),
(2), (4) Date: Jan. 13, 2014

(87) PCT Pub. No.: WO2012/146718
PCT Pub. Date: Nov. 1, 2012

(65) Prior Publication Data
US 2014/0182997 A1    Jul. 3, 2014

(30) Foreign Application Priority Data

Apr. 29, 2011  (EP) .................................... 11164361

(51) Int. Cl.
*B65G 47/46* (2006.01)
*B65G 47/76* (2006.01)
(Continued)

(52) U.S. Cl.
CPC ............ *B65G 47/766* (2013.01); *B65B 35/205* (2013.01); *B65G 47/844* (2013.01); *B65G 47/96* (2013.01)

(58) Field of Classification Search
CPC .................................................. B65G 47/844
USPC .................... 198/370.02, 370.07, 890
See application file for complete search history.

(56) References Cited

U.S. PATENT DOCUMENTS 5,275,273 A * 1/1994 Veit et al. ................. 198/370.02
5,551,217 A * 9/1996 Huening et al. ................ 53/474
(Continued)

FOREIGN PATENT DOCUMENTS

DE    19959843    6/2001
EP     765810 A1  4/1997
(Continued)

OTHER PUBLICATIONS

European Search Report for corresponding EP13185974, search completed Nov. 26, 2013.
(Continued)

*Primary Examiner* — James R Bidwell
(74) *Attorney, Agent, or Firm* — Steven M. Koehler; Westman, Champlin & Koehler P.A.

(57) ABSTRACT

An apparatus includes a frame having a guide, a transport unit including a support tray and a drive to transport the transport unit with respect to the frame. The transport unit includes a pushing member displaceable with respect to the tray transversely with respect to a transporting direction. The pushing member includes a pushing portion that pushes against a product on the tray and an actuator which is guidable along the guide such that the pushing portion displaces with respect to the tray upon moving the transport unit in the transporting direction when the actuator contacts the guide. The pushing portion is resiliently connected to the frame when the actuator contacts the guide under operating conditions. The damping factor of the connection has such a low value that the process of compression/expansion of the resiliency at least partly occurs within a period of contact of the actuator and the guide.

17 Claims, 7 Drawing Sheets

(51) Int. Cl.
*B65B 35/20* (2006.01)
*B65G 47/84* (2006.01)
*B65G 47/96* (2006.01)

(56) References Cited

U.S. PATENT DOCUMENTS

| | | | | |
|---|---|---|---|---|
| 5,613,591 | A | * | 3/1997 | Heit et al. ................ 198/370.02 |
| 5,768,854 | A | * | 6/1998 | Nannini et al. .......... 198/370.07 |
| 6,481,559 | B1 | * | 11/2002 | Maeda et al. ............ 198/370.02 |
| 8,297,430 | B2 | * | 10/2012 | Van Den Goor et al. 198/370.02 |
| 2010/0059333 | A1 | | 3/2010 | Van Den Goor et al. |

FOREIGN PATENT DOCUMENTS

| | | |
|---|---|---|
| EP | 1972579 | 9/2008 |
| EP | 2025628 | 2/2009 |
| EP | 2025628 A2 | 2/2009 |
| EP | 2159174 | 3/2010 |
| EP | 2305582 A1 | 4/2011 |

OTHER PUBLICATIONS

International Search Report and Written Opinion, European Patent Office, PCT/2012/057769, date of mailing Jul. 20, 2012.

* cited by examiner

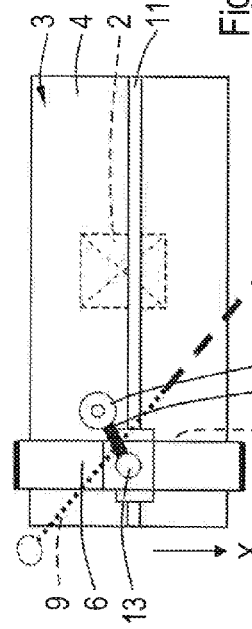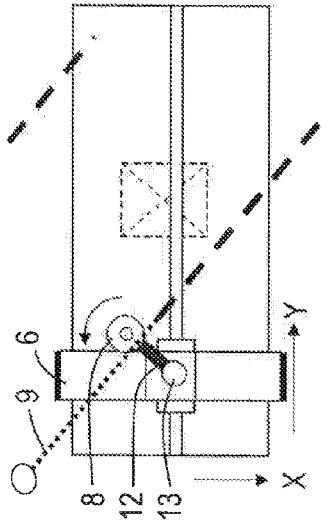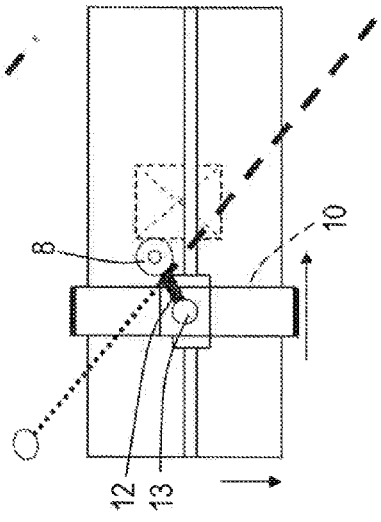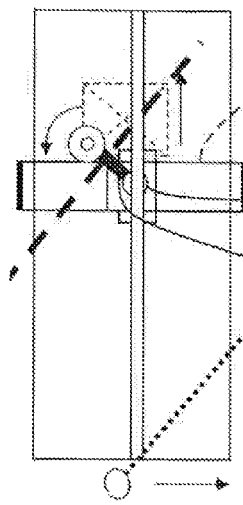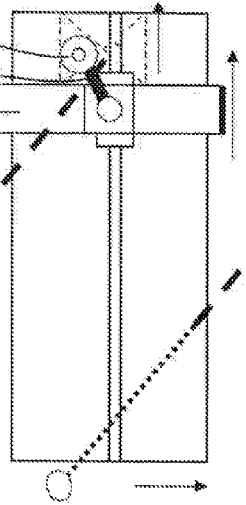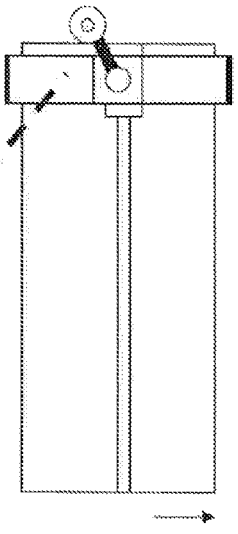

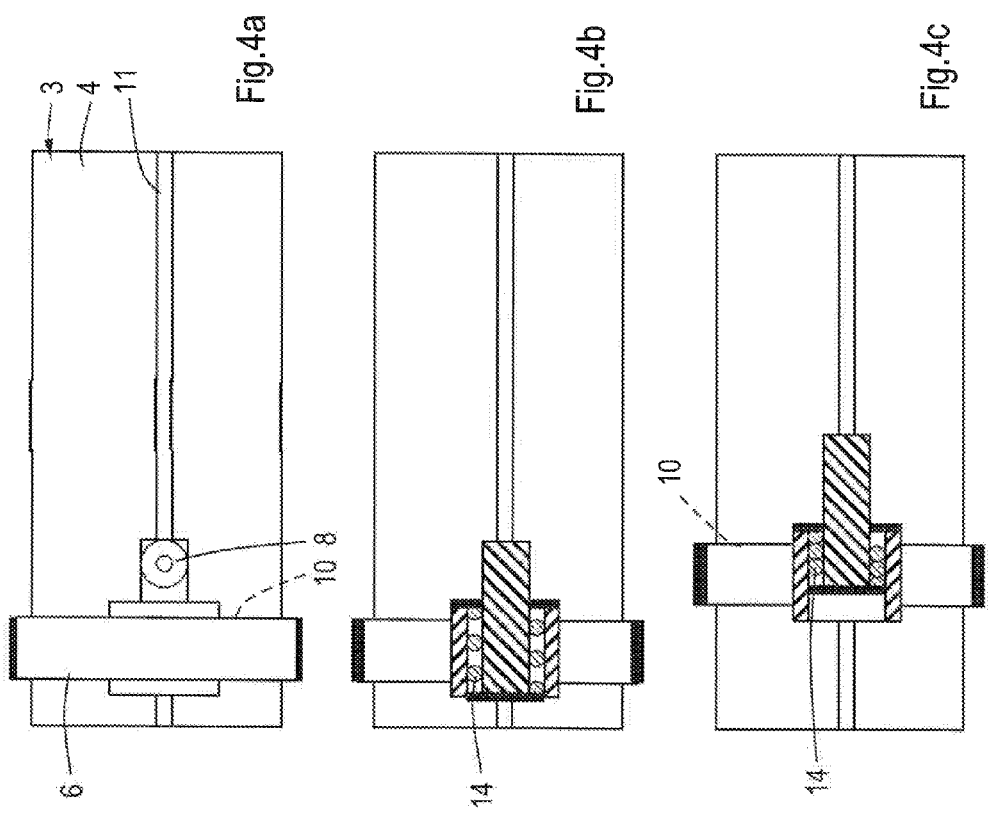

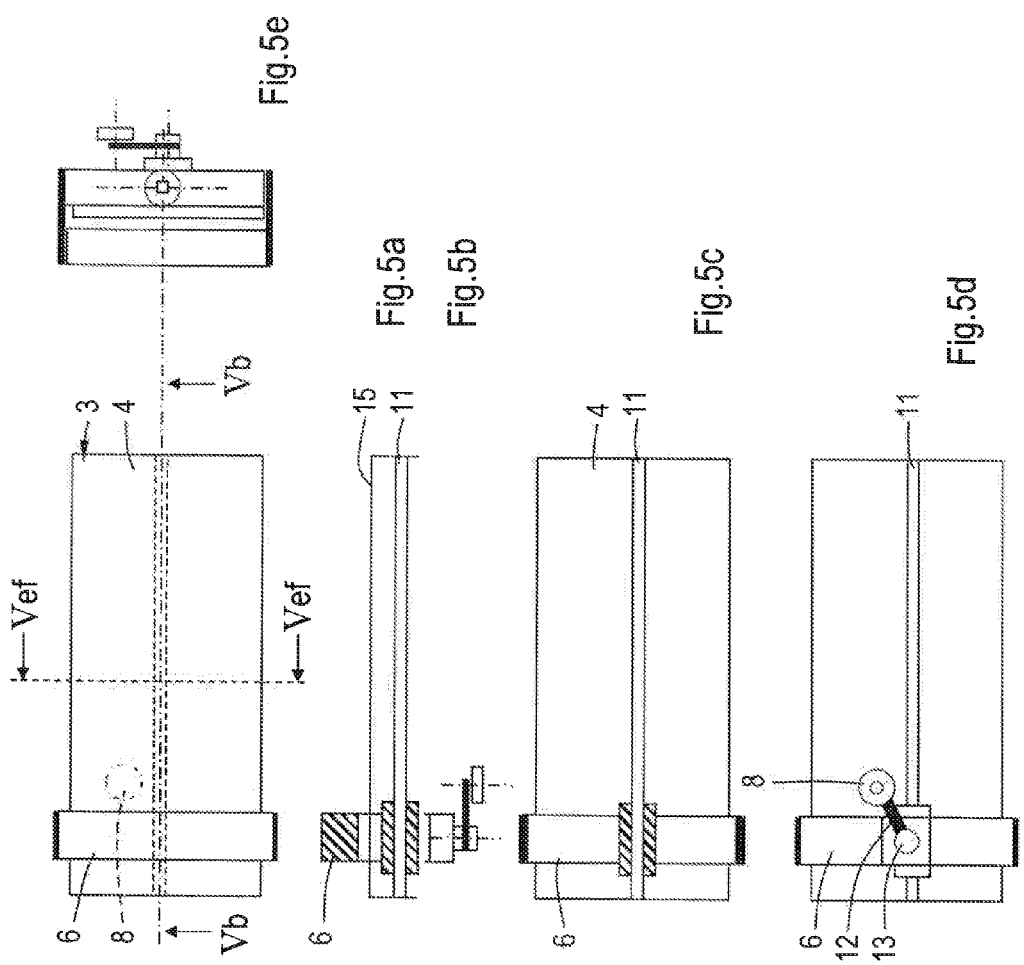

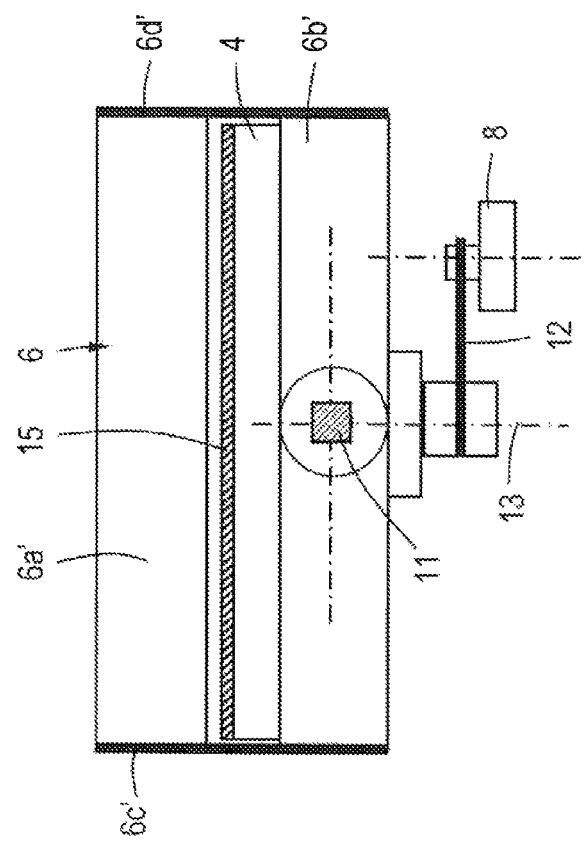
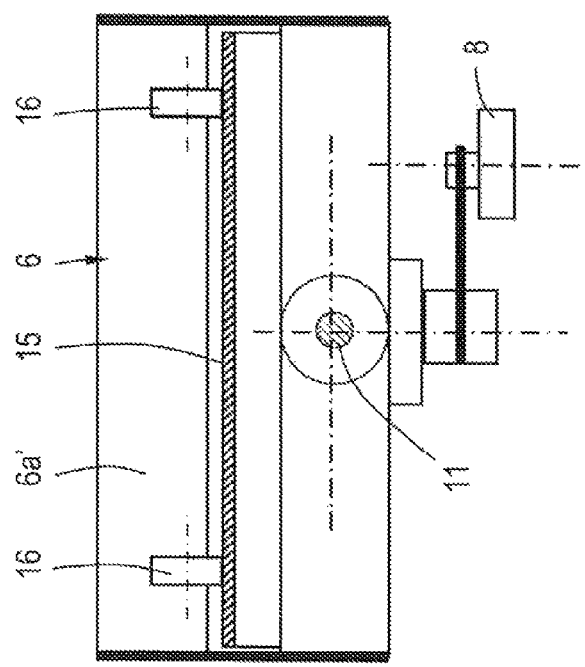

APPARATUS FOR TRANSPORT AND CONTROLLED DISCHARGE OF PRODUCTS

CROSS-REFERENCE TO RELATED APPLICATION

The present application is a national stage filing of International Patent Application Serial No. PCT/EP2012/057769, filed Apr. 27, 2012, and published as WO2012/146718 A1 in English.

BACKGROUND

The discussion below is merely provided for general background information and is not intended to be used as an aid in determining the scope of the claimed subject matter.

Aspects of the invention relate to an apparatus for transport and controlled discharge of products, comprising a frame which is provided with a guide, a transport unit including a support tray for supporting a product and a drive for transporting the transport unit with respect to the frame at a transport speed in a transporting direction, wherein the transport unit is provided with a pushing member which is displaceable with respect to the support tray transversely with respect to the transporting direction for pushing a product from the support tray, which pushing member is provided with a pushing portion that pushes against a product on the support tray under operating conditions and an actuator which is guidable along said guide such that under operating conditions the pushing portion is displaced with respect to the support tray upon moving the transport unit in the transporting direction when the actuator contacts the guide.

SUMMARY

This Summary and the Abstract herein are provided to introduce a selection of concepts in a simplified form that are further described below in the Detailed Description. This Summary and the Abstract are not intended to identify key features or essential features of the claimed subject matter, nor are they intended to be used as an aid in determining the scope of the claimed subject matter. The claimed subject matter is not limited to implementations that solve any or all disadvantages noted in the background.

An aspect of the present invention is to provide an apparatus which is suitable for transporting and controlled discharging of relatively heavy products at relatively high speed.

In order to achieve this aspect the apparatus is adapted such that the pushing portion is resiliently connected to the frame when the actuator contacts the guide under operating conditions and wherein the damping factor of said connection has such a low value that the process of compression and expansion of the resiliency at least partly occurs within a period of contact of the actuator and the guide.

The apparatus provides the opportunity to transport relatively heavy products and/or products at relatively high speed without unacceptable high collision forces when the actuator contacts the guide or when the pushing portion contacts a product on the support tray. In practice a product may be positioned on the support tray at a distance from the initial rest position of the pushing portion such that the pushing portion has already a certain speed upon contacting the product. Due to the resiliency the mentioned contacts occur in a smooth way, whereas the relatively low damping factor causes an additional force on the product during the pushing action which surprisingly appears to improve the discharging process of a product from the support tray. In fact the resiliency serves to absorb the collision energy upon initially contacting the product and returns the energy during pushing the product from the support tray. Although in practice all mass-spring systems have a certain degree of damping, the damping factor may be substantially zero. An increasing damping factor will delay and reduce the additional force on the product.

In one embodiment, the damping factor of the resilient connection has such a low value that the process of compression and expansion of the resiliency substantially occurs within a period of contact of the actuator and the guide. In this case the returning energy of the resiliency to discharge the product is used optimally. Of course, the speed of the pushing member, the spring constant of the resiliency and the damping factor may be adjusted with respect to each other. Their mutual relationship may also depend on weight of the pushing member and the type of products to be transported.

In a practical embodiment the resiliency is provided between the pushing portion and the guide. The resiliency can be as close to the actuator as possible in order to maximize the suspended portion of the pushing member. This reduces the collision forces when the actuator hits the guide. Furthermore, if the resiliency is close to the pushing portion, for example adjacent to the pushing portion at the upper side of the support tray this will take space at the upper side of the support tray which requires relatively wide trays.

In a specific embodiment the actuator itself is resilient so as to form the resiliency. For example, the actuator comprises a wheel that is provided with a tire or curved spokes.

Alternatively the actuator may be connected to the pushing portion through an arm which is rotatably and resiliently coupled to the pushing portion or the actuator may be connected to the pushing portion through a linear spring. In the latter case the linear spring can extend parallel to the direction of displacement of the pushing portion with respect to the support tray.

In a specific embodiment the pushing member forms a substantially closed construction that surrounds the support tray in a plane extending transversely with respect to the direction of displacement of the pushing member with respect to the support tray. This creates a rigid structure of the pushing member such that deformation thereof under operating conditions is minimized.

The transport unit may be provided with a pushing member guide along which the pushing member is mainly guided in the direction of displacement of the pushing member under operating conditions, wherein the pushing member guide may extend at the underside of the support tray. This means that the pushing member above the support tray and/or the side edges thereof may be substantially free from contact with the support tray. Nevertheless, one or more support elements may be present, for example between the pushing member and the support tray, in order to avoid tilting of the pushing member about the pushing member guide.

In a preferred embodiment the pushing member guide extends substantially at the center of the support tray as seen in the transport direction. This provides an even distribution of forces at opposite sides of the pushing member guide under operating conditions which minimizes frictional forces between the pushing member and the pushing member guide.

BRIEF DESCRIPTION OF THE DRAWINGS

Aspects of the invention will hereafter be elucidated with reference to the very schematic drawings showing embodiments of the invention.

FIGS. 3a-f are bottom views of a transport unit of an embodiment of an apparatus at consecutive conditions.

FIG. 4a is a bottom view of an alternative embodiment of a transport unit, FIG. 4b is a partly sectional view of the embodiment of FIG. 4a, and FIG. 4c is similar view as FIG. 4b in a different condition.

FIGS. 5a-e are different views of an alternative embodiment of a transport unit and FIG. 5f is an enlarged view of FIG. 5e.

FIG. 6 is a similar view as FIG. 5f of an alternative embodiment.

DETAILED DESCRIPTION OF THE ILLUSTRATIVE EMBODIMENTS

Figure 1:
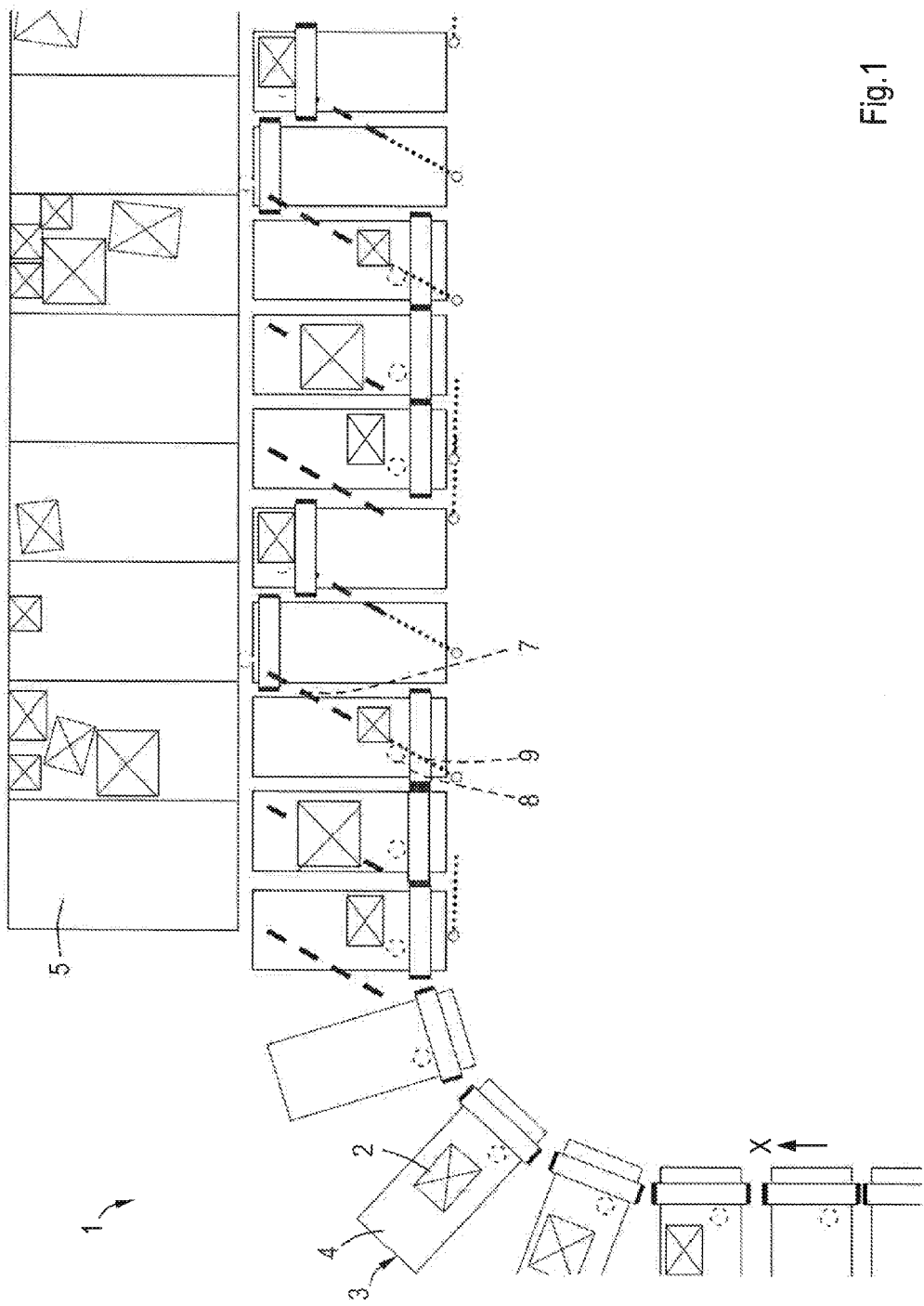
FIG. 1 is a plan view of a portion of an embodiment of an apparatus.

FIG. 1 shows a portion of an embodiment of an apparatus 1 as seen from above. The apparatus 1 is suitable for transport and controlled discharge of products 2. The apparatus 1 comprises a plurality of transport units 3 and a drive (not shown) for transporting the transport units 3 in a transporting direction X. The transport units 3 may be coupled to each other via a chain or belt which may serve as a drive, as well. In the embodiment as shown the transport units 3 follow a curved path as seen from above. Additionally, the path may also vary in vertical direction. Each transport unit 3 includes a support tray 4 which is suitable for supporting at least a product 2. In practice the support trays 4 and the products 2 have such dimensions that the width of a support tray 3 in the transport direction X is larger than that of the product 2.

FIG. 1 also shows a row of discharge stations 5 where under operating conditions the products 2 are removed from the support trays 4.

Each transport unit 3 is provided with a pushing member 6 which is displaceable with respect to the support tray 4 transversely with respect to the transporting direction X. This means that the pushing member 6 is able to push a product 2 laterally from the support tray 4 when the transport unit 3 passes the row of discharge stations 5. The pushing members 6 of the transport units 3 are activated by guides 7 which guide actuators 8 of the pushing members 6. The guides 7 extend obliquely with respect to the transporting direction X and are mounted to a frame (not shown) of the apparatus 1 below the transport units 3. The actuators 8 are also located at the underside of the support trays 4. Guide actuators 9 determine whether an actuator 8 will follow the corresponding guide 7 or not. If the guide actuator 9 is activated the passing actuator 8 of the pushing member 6 is directed to the corresponding guide 7 and the pushing member 6 is displaced in transverse direction.

Figure 7:
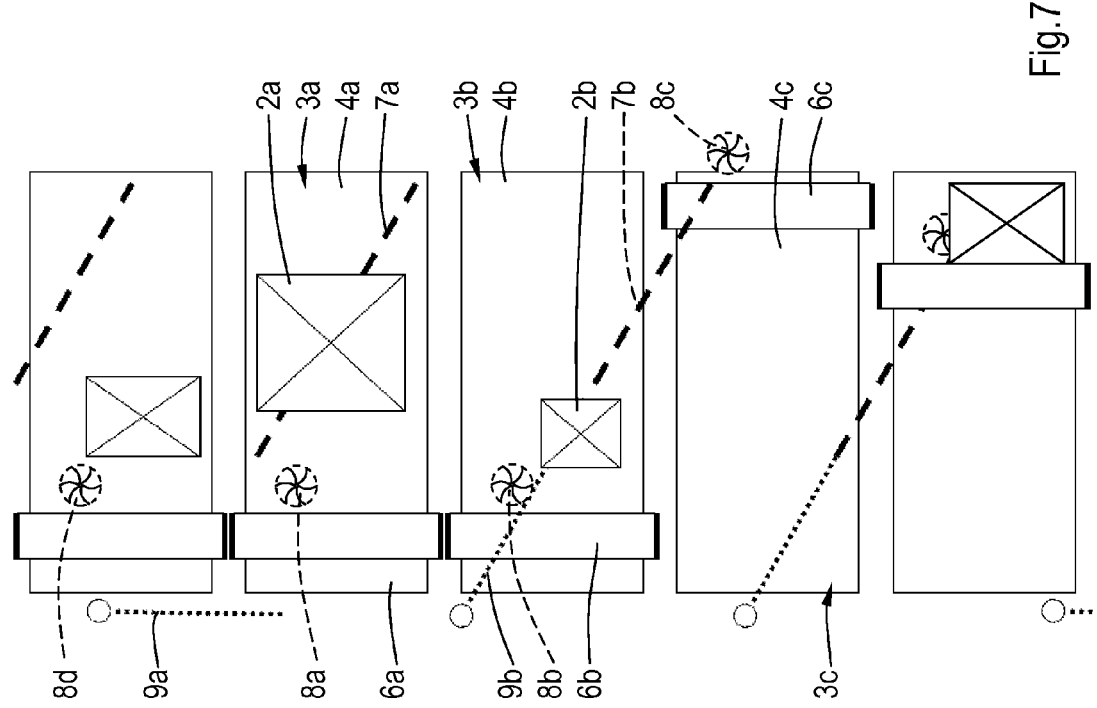
FIG. 7 is an enlarged view similar to FIG. 2 having actuators with curved spokes of a part of the embodiment of FIG. 1.

If a product 2 is present on the support tray 4 it will be pushed from the support tray 4 to one of the discharge stations 5. In this case the actuators 8 are wheels, but alternative types of actuators 8 are conceivable. In a specific embodiment the actuator 8 itself is resilient so as to form the resiliency. For example, actuators 8a-8d comprises a wheel that is provided with a tire (schematically represented by FIG. 2) or curved spokes as illustrated in FIG. 7.

After the transport units 3 have left the discharge stations 5 the actuators 8 are returned to their initial positions by return guides (not shown). This means that the pushing members 6 are also returned to their initial position.

Figure 2:
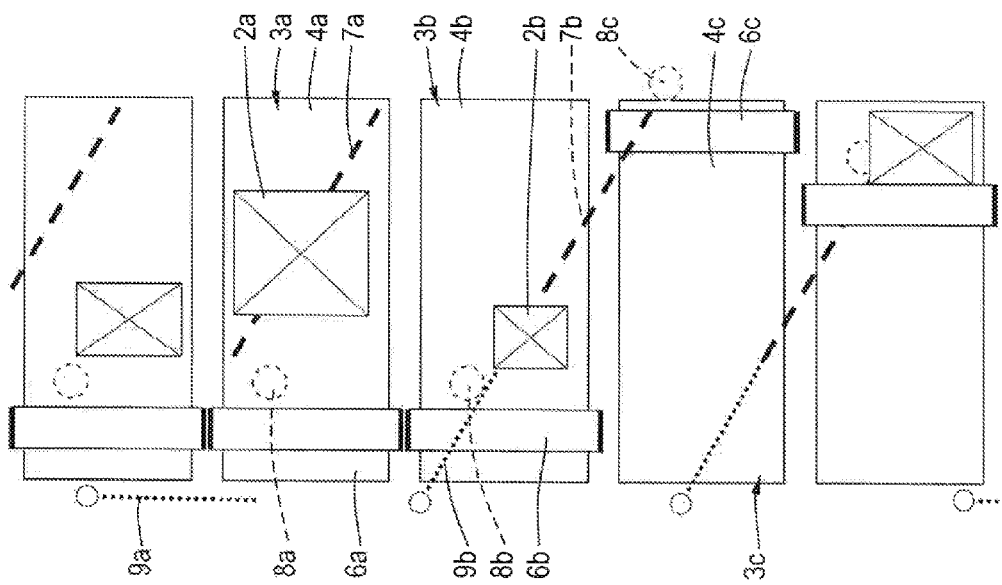
FIG. 2 is an enlarged view of a part of the embodiment of FIG. 1.

FIG. 2 shows the functioning of the apparatus 1 in more detail. In the situation as shown the guide actuator 9a is not activated which means that the passing actuator 8a of the corresponding transport unit 3a is not directed to the guide 7a. As a consequence the pushing member 6a is not displaced and the product 2a remains on the support tray 4a. The guide actuator 9b is activated by turning it anti-clockwise such that the passing actuator 8b of the corresponding transport unit 3b contacts the guide actuator 9b and is directed to the guide 7b. The pushing member 6b will now be displaced and the product 2b will be pushed from the support tray 4b. This process has already happened with the transport unit 3c, corresponding actuator 8c and pushing member 6c, as illustrated in FIG. 2.

FIGS. 3a-f show the transport unit 3 in different conditions in more detail as seen from below. The support tray 4 supports a product 2 and is provided with a pushing member 6. The transport unit 3 is transported in the transporting direction X. The pushing member 6 is provided with a pushing portion 10 and the actuator 8. In this case the pushing portion 10 is formed by a frontal part of the pushing member 6 at the upper side of the support tray 4 and contacts the product 2 upon pushing the product 2 from the support tray 4. The pushing member 6 is formed by a pushing member frame that surrounds the support tray 4. The pushing portion 10 is present above the support tray 4 and the actuator 8 below the support tray 4. The frame-shaped pushing member 6 provides a rigid structure and can be built relatively compact and light with respect to conventional pushing members which do not form a closed frame about the support tray. On the contrary, known pushing members typically are U-shaped, wherein the upper leg of the U-shaped pushing member functions as the pushing portion and the lower leg comprises the actuator.

As described hereinbefore the actuator 8 is guidable along the guide 7 such that under operating conditions the pushing portion 10 is displaced with respect to the support tray 4 upon moving the transport unit 3 in the transporting direction X when the actuator 8 contacts the guide 7.

In the embodiment as shown in FIGS. 3a-f the pushing member 6 is guidable along a pushing member guide 11 which is present at the underside of the transport unit 3. Due to the frame-shaped pushing member 6 as described hereinbefore the torque about an upwardly directed axis that is exerted by the pushing member 6 on the pushing member guide 11 upon pushing a product 2 is relatively low.

Furthermore, the actuator 8 is rotatably connected to the remainder of the pushing member 6, or in this case the pushing portion 10, via an arm 12. The arm 12 is also resiliently connected to the remainder of the pushing member 6 by means of a spring 13. This means that the pushing portion 10 is resiliently connected to the actuator 8. In a broader definition the pushing portion 10 is resiliently connected to the frame (not shown) of the apparatus 1 when the actuator 8 contacts the guide 7. It is noted that in this case the guide 7 is fixed to the frame, but it is also possible that the guide 7 is resiliently mounted to the frame.

FIG. 3a illustrates a condition in which the guide actuator 9 is already activated but in which the actuator 8 does not contact the guide actuator 9 yet. In the condition as illustrated in FIG. 3b the actuator 8 contacts the guide actuator 9 and the pushing member 6 starts to move in transverse direction indicated by arrow Y. It can be seen that due to the contact between the actuator 8 and the guide actuator 9 the arm 12 first turns anti-clockwise while the pushing portion 10 accelerates in transverse direction Y. In a next condition as illustrated in FIG. 3c the spring 13 forces the pushing portion 10 back to the original position with respect to the actuator 8; the relative position of the arm 12 as shown in FIG. 3c is now substantially similar to the initial condition as shown in FIG. 3a.

After a certain displacement of the pushing member 6 in transverse direction Y the pushing portion 10 will contact the product 2 on the support tray 4. This condition is illustrated in FIG. 3d. The pushing portion 10 tends to decelerate upon hitting the product 2 which is possible by the presence of the spring 13. However, the movement of the transport unit 3 in the transport direction X continues. As a result the arm 12 has turned anti-clockwise when comparing the conditions as shown in FIG. 3d and FIG. 3c. The angle of rotation of the arm 12 will be larger when the speed of the pushing member 6 in transverse direction Y is higher and/or the product 2 is heavier. Of course, the spring constant and damping factor may be of influence. It will be clear that due to the spring 13 a collision between the pushing portion 10 and the product 2 is smoothened.

In a next condition as illustrated in FIG. 3e the spring 13 forces the pushing portion 10 back to the original position with respect to the actuator 8. The relative position of the arm 12 as shown in FIG. 3e is now substantially similar to the condition as shown in FIG. 3c. An additional advantage of the spring effect is that due to the spring force the product 2 will be accelerated which improves the discharge of the product 2 from the transport tray 4. FIG. 3f shows a condition in which the pushing member 6 has reached a final position and the product 2 has been pushed away from the support tray 4.

The damping factor of the resilient connection between the pushing portion 10 and the frame of the apparatus 1 has such a low value that the process of compression and expansion of the resiliency at least partly occurs within a period of contact of the actuator 8 and the guide 7. In practice, this means that the arm 12 of the embodiment as shown in FIGS. 3a-f may rotate clockwise upon contacting a product 2 and immediately back within the period of contact of the actuator 8 and the guide 7. This provides the opportunity to use the spring force to accelerate the product 2 within the final phase of the discharging process, as described hereinbefore. The damping factor may be close to zero, although in practice there will always be a certain degree of damping. In any case, the damping factor is smaller than a highly energy absorbing material like a shape memory foam. A practical coefficient of the spring 13 is 1-1.5 N per degree angle of rotation of the arm 12, but higher or lower coefficients are possible.

FIGS. 4a-c show an alternative embodiment of a transport unit 3, in which a linear spring 14 is applied. In these drawings the parts that are similar to those shown in the other figures are indicated by corresponding reference signs. FIGS. 4b and 4c show the linear spring 14 in two different conditions. In the condition as illustrated in FIG. 4b the pushing portion 10 and the linear spring 14 are in a rest condition. FIG. 4c shows a condition in which the actuator 8 contacts the guide 7; due to the inertia of the pushing portion 10 the linear spring 14 is compressed. In a next condition (not shown) the linear spring 14 will expand until a product 2 on the support tray 4 is hit. Upon contacting the product 2 the linear spring 14 will be compressed again. In this embodiment the linear spring 14 extends parallel to the pushing member guide 11. The center lines of the linear spring 14, the pushing member guide 11 and the actuator 8 extend substantially in the same upwardly directed plane.

FIGS. 5a-f shows different views of an alternative embodiment of a transport unit 3. FIG. 5a is a plan view of the transport unit 3 and FIG. 5b is a sectional view thereof as seen along the line Vb-Vb in FIG. 5a. FIGS. 5c and 5d show the bottom side of the transport unit 3, whereas FIG. 5c shows a sectional view of a part of the pushing member 6. FIGS. 5e-f show a sectional view of the transport unit 3 as seen along the line Vef-Vef in FIG. 5a. In the embodiment as shown in FIGS. 5a-f the arm 12 and spring 13 are shown, as well. The transport tray 4 has an upper surface 15, which is substantial flat in this embodiment.

In the embodiment as shown in FIGS. 5a-f the structure of the pushing member 6 is shown in more detail. The pushing member 6 forms a substantially closed construction that surrounds the support tray 4 in a plane extending transversely with respect to the direction of displacement of the pushing member 6. In the embodiment as shown the pushing member 6 comprises a horizontally oriented upper element 6a' which extends above the support tray 4, a lower element 6b' which extend below the support tray 4 and two opposite side elements 6c', 6d' which each join end portions of the upper and lower elements 6a', 6b'. Preferably, the elements 6a'-d' are substantially free from the support tray 4 in order to minimize friction during displacement of the pushing member 6 along the support tray 4. Due to these features the pushing member 6 appears to be a rigid construction. This allows to create only a small distance between the upper element 6a' and the upper surface 15 without hitting each other due to deformation of the pushing member 6 under operating conditions. It is also advantageous when the side elements 6c' and 6d' are plate-shaped since this minimizes the width of the transport units 3 in the transporting direction X.

The lower element 6b' of the pushing member 6 is mounted to the pushing member guide 11. The pushing member guide 11 extends at the underside of the support tray 4 and may be a straight rod, having a rectangular cross section for example. In this case the pushing member guide 11 extends substantially at the center of the support tray 4 as seen in the transport direction. Furthermore, the actuator 8 is positioned such that a force from the guide 7 on the pushing member 6 substantially engages at the pushing member guide 11. Since the pushing member guide 11 of the embodiment as shown in FIG. 5f has a rectangular cross-section a tilting movement of the pushing member 6 about the center line of the pushing member guide 11 is avoided. FIG. 6 shows an alternative embodiment in which the pushing member guide 11 has a circular cross-section. Since in this case the pushing member 6 tends to tilt about the center line of the pushing member guide 11 the pushing member 6 is provided with rollers 16. It is noted that under operating conditions the pushing member 6 is mainly guided by the pushing member guide 11 in the displacement direction of the pushing member 6, whereas the rollers 16 only avoid a rotational movement of the pushing member 6 about the pushing member guide 11.

In general terms, the pushing member guide 11 supports the pushing member 6 at least in a direction parallel to the transporting direction X, and additionally also upwardly and/or downwardly. In the embodiment of FIG. 6 the pushing member 6 is supported downwardly entirely by the pushing member guide 11 and upwardly mainly by the pushing member guide 11 and only partly by the upper surface 15 of the support tray 4. In the embodiment of FIG. 5f the pushing member 6 is supported upwardly and downwardly entirely by the pushing member guide 11.

It is noted that the embodiment as shown in FIGS. 5a-f is not necessarily associated to the features related to the spring effect as described hereinbefore. In other words, the invention is also related to the following aspects:

Aspect 1: An apparatus for transport and controlled discharge of products, comprising a guide, a transport unit including a support tray for supporting a product and driving means for transporting the transport unit in a transporting direction, wherein the transport unit is provided with a pushing member which is displaceable with respect to the support tray in a displacement direction extending transversely with respect to the transporting direction for pushing a product from the transport surface, which pushing member is provided with a pushing portion which pushes against a product under operating conditions and an actuator which is guidable along said guide such that under operating conditions the pushing portion is displaced with respect to the support tray upon moving the transport unit in the transporting direction when the actuator contacts the guide, wherein the pushing member forms a substantially closed construction that surrounds the support tray in a plane extending transversely with respect to the displacement direction of the pushing member, wherein the transport unit is provided with a pushing member guide along which the pushing member is mainly guided in the displacement direction under operating conditions, which pushing member guide extends at the underside of the support tray.

Aspect 2: An apparatus according to aspect 1, wherein the pushing member guide extends substantially at the center of the support tray as seen in the transport direction.

Aspect 3: An apparatus according to aspect 1 or 2, wherein the actuator is positioned such that a force from the guide on the pushing member substantially engages at the pushing member guide.

Aspect 4: An apparatus according to one of the preceding aspects, wherein the support tray is plate shaped and dimensioned such that its thickness is smaller than the height of the part of the pushing member that extends above the support tray or at least smaller than 50% of that height.

Aspect 5: An apparatus according to one of the preceding aspects, wherein the pushing member is substantially free from the support tray at the upper side and/or side walls of the support tray.

Aspect 6: An apparatus according to one of the aspects 1-4, wherein the pushing member is provided with at least an additional support element for avoiding rotational movement of the pushing member about a longitudinal axis of the pushing member guide.

Aspect 7: An apparatus according to aspect 6, wherein the pushing member is provided with two supporting elements, preferably rollers, that contact the upper surface of the support tray, and which are located at both sides of the pushing member guide as seen in the transport direction.

Aspect 8: An apparatus according to one of the preceding aspects, wherein the apparatus comprises a plurality of said transport units which follow a non-linear transport path as seen from above.

The mentioned features in these aspects may be combined with the embodiments as described hereinbefore and shown in the drawings.

The invention is not limited to the embodiments as described above and shown in the drawings, which can be varied in several ways without departing from the scope of the invention. It is possible that a resiliency is created closer to the pushing portion than the actuator, for example the pushing portion is formed by an element which is mounted to the remainder of the pushing member via springs. Alternatively, the guide is resiliently mounted to the frame of the apparatus. It is also possible that the actuator comprises a wheel having a tire or curved spokes such that the actuator itself functions as a resiliency.

What is claimed is:

1. An apparatus for transport and controlled discharge of products, comprising a frame which is provided with a guide, a transport unit including a support tray configured to support a product and a drive configured to transport the transport unit with respect to the frame at a transport speed in a transporting direction, wherein the transport unit is provided with a pushing member which is displaceable with respect to the support tray transversely with respect to the transporting direction for pushing a product from the support tray, which pushing member is provided with a pushing portion that pushes against a product on the support tray under operating conditions and an actuator which is guidable along said guide such that under operating conditions the pushing portion is displaced with respect to the support tray upon moving the transport unit in the transporting direction when the actuator contacts the guide, wherein the apparatus is configured such that the pushing portion is resiliently connected to the frame when the actuator contacts the guide under operating conditions and wherein a damping factor of said connection has such a low value that the process of compression and expansion of the resiliency at least partly occurs within a period of contact of the actuator and the guide.

2. The apparatus according to claim 1, wherein the resiliency is provided between the pushing portion and the guide.

3. The apparatus according to claim 1, wherein the actuator is resilient so as to form the resiliency.

4. The apparatus according to claim 1, wherein the actuator comprises a wheel.

5. The apparatus according to claim 3, wherein the wheel comprises a tire or curved spokes.

6. The apparatus according to claim 2, wherein the actuator is connected to the pushing portion through an arm which is rotatably and resiliently coupled to the pushing portion.

7. The apparatus according to claim 2, wherein the actuator is connected to the pushing portion through a linear spring.

8. The apparatus according to claim 1, wherein the damping factor is substantially zero.

9. The apparatus according to claim 1, wherein the pushing member forms a substantially closed construction that surrounds the support tray in a plane extending transversely with respect to the direction of displacement of the pushing member with respect to the support tray.

10. The apparatus according to claim 9, wherein the transport unit is provided with a pushing member guide along which the pushing member is mainly guided under operating conditions, which pushing member guide extends at the underside of the support tray.

11. The apparatus according to claim 10, wherein the pushing member guide extends substantially at the center of the support tray as seen in the transport direction.

12. The apparatus according to claim 1, wherein the resiliency is provided between the guide and the frame.

13. The apparatus according to claim 1, wherein the damping factor is smaller than that of a shape memory foam.

14. The apparatus of claim 7 where the linear spring extends parallel to the direction of displacement of the pushing portion with respect to the support tray.

15. The apparatus according to claim 1, wherein the resiliency is such that collision energy is absorbed when the pusher portion contacts a product and the energy is returned during pushing the product from the support tray.

16. An apparatus for transport and controlled discharge of products, comprising:
 a frame including a guide;
 a transport unit including a support tray for supporting a product; and a drive configured to transport the transport unit with respect to the frame at a transport speed in a transporting direction;

wherein the transport unit is provided with a pushing member which is displaceable with respect to the support tray transversely with respect to the transporting direction configured to push a product from the support tray, the pushing member resiliently coupled to the frame to impart an additional force to a product in excess of a pushing force associated with a speed of travel of the pushing member.

17. An apparatus for transport and controlled discharge of products, comprising:

a frame including guide;

a transport unit including a support tray for supporting a product; and a drive configured to transport the transport unit with respect to the frame at a transport speed in a transporting direction;

wherein the transport unit is provided with a pushing member which is displaceable with respect to the support tray transversely with respect to the transporting direction configured to push a product from the support tray, the pushing member resiliently coupled to the frame to impart an additional force to a product in excess of a pushing force associated with a speed of travel of the pushing member, the pushing member further configured to resiliently contact the guide or a product on the support tray in a smooth motion so as to absorb collision energy upon initial contact with the guide of the product.

* * * * *